United States Patent
Hafner et al.

[15] 3,666,714
[45] May 30, 1972

[54] POLYACETALS STABILIZED WITH SECONDARY ALKALI METAL PHOSPHATES

[72] Inventors: Karl-Heinz Hafner; Harald Cherdron, both of c/o Farbwerke Hoechst AG, Frankfurt am Main, Germany

[22] Filed: Nov. 4, 1969

[21] Appl. No.: 874,018

[30] Foreign Application Priority Data

Nov. 15, 1968 Germany .....................P 18 09 059.0

[52] U.S. Cl..................260/45.7 P, 260/45.9 P, 260/45.95, 260/67 FP
[51] Int. Cl.................................................C08g 51/56
[58] Field of Search................260/45.7 P, 67 FP

[56] References Cited

UNITED STATES PATENTS

| | | | |
|---|---|---|---|
| 3,385,827 | 5/1968 | Fischer et al. | 260/67 |
| 2,938,015 | 5/1960 | Gormley | 260/75 |
| 2,967,852 | 1/1961 | Frese | 260/45.9 |
| 3,201,369 | 8/1965 | Dell et al. | 260/45.75 |
| 3,228,898 | 1/1966 | Illing et al. | 260/18 |
| 3,262,905 | 7/1966 | Martins | 260/45.7 |

FOREIGN PATENTS OR APPLICATIONS 986,925 3/1965 Great Britain

OTHER PUBLICATIONS

Kirk et al., " Encyclopedia of Chemical Technology," Second Edition, 1968, Vol. 15, page 238

*Primary Examiner*—Donald E. Czaja
*Assistant Examiner*—R. A. White
*Attorney*—Curtis, Morris & Safford

[57] ABSTRACT

Polyacetals comprising oxymethylene and oxyalkylene units in the main chain of the macromolecules are stabilized against the action of heat and oxygen by means of secondary alkali metal phosphates. Thermoplastic molding compositions prepared from the stabilized polyacetals are suitable for the manufacture of finished and semi-finished products, for example molded articles, household utensils, and parts of machines.

7 Claims, No Drawings

POLYACETALS STABILIZED WITH SECONDARY ALKALI METAL PHOSPHATES

The present invention relates to thermoplastic moulding compositions of polyacetals stabilized against the action of heat and oxygen.

It is known that copolymers containing oxymethylene and oxyalkylene groups can be depolymerized, starting at the ends of the polymer chain, by heat treatment in a solvent, as well as in the melt and in an aqueous suspension, under the influence of basic catalysts, for example alkali metal or alkaline earth metal hydroxydes or soda, in the absence or presence of a formaldehyde absorbing agent, for example urea or diethanolamine. The depolymerization reaction stops at the first oxyalkylene group with respect to the end of the polymer chain. The copolymers thus treated remain stable in the absence of oxygen and compounds having an acid reaction even when heated above their melting point, i.e., no further formaldehyde is split off.

The methods of degradation in a solvent are especially advantageous because of their short reaction time (cf. British Pat. No. 986,925). They are carried out at temperatures of from 90° to 200° C, using bases, such as ammonia or triethylamine, in mixtures of water and organic hydroxyl compounds, for example isopropanol, possibly in the presence of a formaldehyde absorbing agent or a swelling agent. It is further known that the thermal stability of oxymethylene polymers can be increased within a specific pH-range by alkaline hydrolysis in which process inorganic or organic bases are used, such as hydroxydes, salts, or amines (cf. British Pat. No. 1,112,270).

There is, however, a serious drawback in the technical utilization of the above-mentioned methods of degradation, because trioxane copolymers which, in the course of the treatment, i.e. when heated in air in the presence of stabilizers up to a temperature of 230° C, shall not only remain stable, but also colorless, can be obtained only if the copolymers after the degradation reaction are washed thoroughly in order to remove the residual base and water-soluble degradation products.

The present invention provides a thermoplastic molding composition of polyacetals comprising oxymethylene and oxyalkylene units with 2 to 8 vicinal carbon atoms in the main chain, which compositions contain 0.001 to 1.0 percent by weight of a secondary alkali metal phosphate.

This invention also provides a process for stabilizing polyacetals comprising oxymethylene and oxyalkylene units with 2 to 8 vicinal carbon atoms in the main chain by heating the polyacetals in an aqueous/alcoholic solution in the presence of a base, at a temperature in the range of from 100° to 180° C, which comprises using as bases secondary alkali metal phosphates in an amount of from 0.001 to 1.0 percent by weight, calculated on the polyacetal.

The polyacetals used in accordance with the invention are co- or terpolymers of trioxane prepared in known manner by cationic polymerization in the melt, in solution, or in suspension. As cationic initiators use is made of protonic acids, for example sulfuric acid or perchloric acid, Lewis acids, for example boron trifluoride, or complex compounds of Lewis acids, for example etherates, as well as oxonium or diazonium salts of complex acids whose anions contain Lewis acids, for example oxonium fluoroborates or aryldiazonium fluoroborates.

Especially suitable as co-components for the cationic copolymerization with trioxane are cyclic ethers and cyclic or linear acetals in an amount of from 0.1 to 20, preferably 0.5 to 10 percent by weight, calculated on the total monomer mixture.

In most cases, use is made of cyclic ethers having 3 to 5 ring members, preferably epoxides. Especially suitable as a cyclic ether with 3 ring members is ethylene oxide; also suitable are styrene oxide, propylene oxide, epichlorhydrin and phenylglycidyl ether. As a 3-membered cyclic ether, use may also be made of cyclohexene oxide.

Suitable as cyclic acetals are compounds of saturated or unsaturated aliphatic or cycloaliphatic diols with aliphatic aldehydes or thioaldehydes, preferably formaldehyde.

Use is made especially of cyclic formals having 5 to 11, preferably 5 to 8 ring members, i.e. cyclic formals of $\alpha,\omega$-diols having two to eight, preferably two to four carbon atoms in the chain, the carbon chain of which may be interrupted by an oxygen atom at intervals of two carbon atoms.

Especially suitable as cyclic acetals are glycol formal (1,3-dioxolane), butanediol formal (1,3-dioxepane), and diglycol formal (1,3,6-trioxocane). Also suitable are 4-chloro-methyl-1,3-dioxolane and hexanediol formal (1,3-dioxonane), as well as butenediol formal (1,3-dioxa-cycloheptene-(5)).

Homo- or copolymers of the above-specified cyclic acetals are as suitable as linear acetals as are linear condensates of aliphatic or cycloaliphatic $\alpha,\omega$-diols with aliphatic aldehydes or thioaldehydes, preferably formaldehyde. Use is made especially of linear formals of saturated aliphatic $\alpha,\omega$-diols having two to eight, preferably two to four carbon atoms, for example polydioxolane.

As a tercomponent for the copolymerization of trioxane and cyclic ethers or acetals there may also be used glycidyl and dioxolanyl compounds having several polymerizable groups in the molecule in an amount of from 0.005 to 5, preferably 0.01 to 2 percent by weight, especially alkylglycidyl formals, for example methylglycidyl formal, polyglycol diglycidyl ethers, for example diethylene glycol diglycidyl ether, and also alkanediol diglycidyl ethers, for example butanediol diglycidyl ether, as well as bis (alkane triol) triformals, for example bis(1,2,6-hexanetriol) triformal.

The moulding composition in accordance with the invention contains a secondary alkali metal phosphate in an amount of from 0.001 to 1.0, preferably 0.005 to 0.5 percent by weight, calculated on the total composition. Secondary alkali metal phosphates are the secondary alkali metal salts of orthophosphoric acid, for example dibasic sodium phosphate $Na_2HPO_4$, dibasic potassium phosphate $K_2HPO_4$. The secondary phosphate is added to the polyacetal to be stabilized in a dissolved state, the solvent being an alcohol/water mixture.

Especially suitable alcohol components of the solvent mixture are primary aliphatic alcohols having 1 to 4 carbon atoms, for example methanol, ethanol, or propanol. They are used in an amount of 20 to 80, preferably 30 to 70 parts by weight for 80 to 20, preferably 70 to 30 parts by weight of water. The ratio of solid matter to liquid medium is in the range of from 1 : 3 to 1 : 30, preferably 1 : 5 to 1 : 20.

The solution of the secondary alkali metal phosphate is generally prepared by dissolving the salt in the solvent. It is also possible, however, to use primary or tertiary alkali metal phosphates and to adjust the pH value corresponding to the respective solution of the secondary phosphate by the addition of alkali (in the case of primary phosphates), or by adding an acid, preferably phosphoric acid (in the case of tertiary phosphates).

The stabilization is advantageously carried out by suspending the polyacetal to be stabilized in an aqueous/alcoholic solution containing the secondary phosphate, and heating the polyacetal in an autoclave provided with stirring means under a pressure of from 3 to 50, preferably 5 to 30 atmospheres gage for 1 to 30, preferably 3 to 15 minutes at a temperature in the range of from 100° to 180° C, preferably 130° to 170° C, the polyacetal thus being dissolved. After completion of the reaction the reaction mixture is cooled and the precipitated polymer is filtered off with suction and dried at a temperature of from 50° to 70° C in an oven under reduced pressure and without subsequent washing. The products thus treated exhibit an excellent thermal stability and remain colorless even after heating in air at 230° C in the presence of stabilizers.

The stability was determined by ascertaining the loss of weight of a polymer sample to which 0.7 percent by weight of 2,2'-methylene-bis(4-methyl-6-tert. butyl phenol) and 0.2 percent by weight of dicyandiamide have been added, by heating it at 230° C for 45 minutes in air. The color of the samples was determined visually.

The unexpected technical advantages of the molding compositions obtained in accordance with the invention as compared with a known product (cf. British Pat. No. 1,112,270) can be seen from the following comparative experiment:

1 Kilogram of a copolymer prepared from 98 parts by weight of trioxane and 2 parts by weight of ethylene oxide was washed in a solution of 2 grams of triethylamine, 5.4 kilograms of methanol and 3.6 kilograms of water and heated for 15 minutes at 155° C in a 20 liter autoclave with stirrer. After cooling the copolymer was filtered off with suction and divided into two parts; the first half (sample A) was washed with water until it was neutral and then dried at a temperature of from 50 to 70° C under reduced pressure (about 150 torr), whereas the second half (sample B) was dried directly without any subsequent treatment.

a. Loss of weight of the washed sample A: 0.0193 percent/ min. Color of the washed sample after the stability test: almost white.
b. Loss of weight of the unwashed sample B: 0.0200 percent/ min. Color of the unwashed sample B after the stability test: yellowish-brown.

In contradistinction thereto the molding compositions obtained in accordance with the invention remain colorless after the stability test (cf. examples below). Besides that, no washing is required in the preparation of the molding compositions in order to remove the residual base.

The molding compositions according to the invention can be comminuted mechanically, for example by chopping or grinding, to give granules, chips, flakes, or powder. They are thermoplastic and may be worked up by injection-molding, extrusion, spinning from the melt or deep drawing; they may be used for the manufacture of semi-finished or finished products such as molded articles, for example bars, ribbons, rods, bristles, filaments, fibers, plates, films, sheets, pipes or tubes, as well as household utensils, for example dishes or beakers, and parts of machines, for example casings or cogwheels.

The following Examples serve to illustrate the invention, the parts and percentages being by weight unless otherwise stated.

EXAMPLE 1

One Kilogram of a copolymer, prepared from 98 parts of trioxane and 2 parts of ethylene oxide, were suspended in a solution of 2 grams of secondary sodium phosphate, 5.4 kilograms of methanol and 3.6 kilograms of water and heated for 15 minutes at 155° C in a 20 liter autoclave with stirrer. After cooling the copolymer was filtered off with suction and dried at a temperature of from 50° to 70° C under reduced pressure.

Loss of weight: 0.0202 percent/ min.
Color after the stability test: white.

EXAMPLE 2

One Kilogram of a copolymer, prepared from 96.6 parts of trioxane and 3.4 parts of dioxolane, were suspended in a solution of 5 grams of secondary sodium phosphate, 5.4 kilograms of methanol and 3.6 kilograms of water and heated for 15 minutes at 155° C in a 20 liter autoclave with stirrer. After cooling the copolymer was filtered off with suction and dried at a temperature of from 50° to 70° C under reduced pressure.

Loss of weight: 0.0207 percent/ min.
Color after the stability test: white.

EXAMPLE 3

0.5 Kilogram of a copolymer, prepared from 98 parts of trioxane and 2 parts of ethylene oxide, were suspended in a solution of 2 grams of secondary sodium phosphate, 5.4 kilograms of methanol and 3.6 kilograms of water and heated for 15 minutes at 155° C in a 20 liter autoclave with stirrer. After cooling the copolymer was filtered off with suction and dried at a temperature of from 50° to 70° C under reduced pressure.

Loss of weight: 0.0204 percent/ min.
Color after the stability test: white.

EXAMPLE 4

One Kilogram of a terpolymer, prepared from 98 parts of trioxane, 2 parts of ethylene oxide and 0.05 part of 1,4-butanediol diglycidyl ether, were suspended in a solution of 3 grams of secondary sodium phosphate, 5.4 kilograms of methanol and 3.6 kilograms of water and heated for 20 minutes at 155° C in a 20 liter autoclave with stirrer. After cooling the terpolymer was filtered off with suction and dried at a temperature of from 50 to 70° C under reduced pressure.

Loss of weight: 0.0187 percent/ min.
Color after the stability test: white.

We claim:

1. A process for stabilizing a polyacetal polymer comprising oxymethylene and oxyalkylene units having 2 to 8 vicinal carbon atoms in the main chain which comprises heating the polyacetal polymer in an aqueous alcoholic solution of from 0.001 to 1 percent by weight, based on the weight of polyacetal, of a secondary alkali metal phosphate at a temperature of 100° to 180° C., separating the thus treated polymer from the solution and drying the separated polymer without prior washing.

2. A process for stabilizing a polyacetal polymer comprising oxymethylene and oxyalkylene units having 2 to 8 vicinal carbon atoms in the main chain which comprises heating the polyacetal polymer in an aqueous alcoholic solution of from 0.001 to 1 percent by weight, based on the weight of polyacetal, of a secondary alkali metal phosphate at a temperature of 100° to 180° C., separating the thus treated polymer from the solution, drying the separated polymer without prior washing, and incorporating in the separated polymer a stabilizing amount of 2,2'-methylene-bis(4-methyl-6-tert. butyl phenol) and dicyandiamide.

3. A process according to claim 2 wherein about 0.7 percent by weight of 2,2'-methylene-bis(4-methyl-6-tert. butyl phenol) and about 0.2 percent by weight of dicyandiamide are added to the dried polymer.

4. The process of claim 1 wherein the secondary alkali metal phosphate is dibasic sodium phosphate.

5. The process of claim 1 wherein the polyacetal is a copolymer of trioxane and ethylene oxide.

6. The process of claim 1 wherein the polyacetal is a copolymer of trioxane and dioxolane.

7. The process of claim 1 wherein the polyacetal is a terpolymer of trioxane, ethylene oxide, and 1,4-butanediol diglycidyl ether.

* * * * *

UNITED STATES PATENT OFFICE
CERTIFICATE OF CORRECTION

Patent No. 3,666,714     Dated May 30, 1972

Inventor(s) Hafner and Cherdron

It is certified that error appears in the above-identified patent and that said Letters Patent are hereby corrected as shown below:

In the Heading:

After the identification of the inventors, insert --Assignee Farbwerke Hoechst Aktiengesellschaft vormals Meister, Lucius & Bruning Frankfurt am Main, Germany--.

Signed and sealed this 28th day of November 1972.

(SEAL)
Attest:

EDWARD M. FLETCHER, JR.　　　　　　　　ROBERT GOTTSCHALK
Attesting Officer　　　　　　　　　　　　Commissioner of Patents